United States Patent [19]

Sordello et al.

[11] 4,122,501
[45] Oct. 24, 1978

[54] SYSTEM FOR RECORDING AND READING BACK DATA ON A RECORDING MEDIA

[75] Inventors: Frank J. Sordello, Los Gatos; Robert L. Cloke, Santa Clara, both of Calif.

[73] Assignee: Sperry Rand Corporation, New York, N.Y.

[21] Appl. No.: 750,204

[22] Filed: Dec. 13, 1976

[51] Int. Cl.² .................................................. G11B 5/09
[52] U.S. Cl. ................................................................ 360/51
[58] Field of Search .................................................. 360/51

[56] References Cited

U.S. PATENT DOCUMENTS

| 3,653,009 | 3/1972 | Krause | 360/51 |
|---|---|---|---|
| 3,864,735 | 2/1975 | Davis et al. | 360/51 |
| 3,898,580 | 8/1975 | Millsep | 360/51 |
| 3,900,890 | 8/1975 | Eibner | 360/51 |

Primary Examiner—Vincent P. Canney
Attorney, Agent, or Firm—Gerald L. Moore

[57] ABSTRACT

A system for detecting data from and recording data on a recording media whereby a single clocking signal generator is utilized for generating the clocking signal both during the recording of data on and the reading of data from the recording media.

2 Claims, 5 Drawing Figures

SYSTEM FOR RECORDING AND READING BACK DATA ON A RECORDING MEDIA

BACKGROUND OF THE INVENTION

In data recording systems there must always accompany the recorded data a clocking signal or means to generate a clocking signal during readback so that the information can be properly interpreted. Thus during recording there is supplied to the write electronic circuit a clocking signal which is used to regulate the writing process. In past devices this clocking signal has been supplied by a phase locked circuit having an oscillator for the generation of a pulsed signal.

During the readback phase of data recording the data is detected and a clocking signal is generated which must be synchronized in frequency and phase with the data. The clocking signal is then used to decode the data for processing. In order to generate a satisfactory clocking signal during readback the oscillator in the readback circuit must be set to the exact frequency and also corrected in phase relationship with the data. To achieve this result there is recorded at the beginning of each data address on the media a series of clocking pulses provided for the purpose of synchronizing the frequency and phase relationship between the data and the signal of the clocking pulse generator. Of course no data can be read during this synchronizing period while the clocking signal is being synchronized with the data signal. Thus there is always a time delay between the location and verification of the address and the reading of the data. In addition the inclusion of these clocking pulses at the recorded data addresses takes up space on the recording media. Thus any improvement in speeding up the synchronization of the readout clocking signal with the data will provide a marked improvement both as to time and media recording space in the system.

One improvement in such data storage apparatus is disclosed in U.S. Pat. No. 3,577,132 issued May 4, 1971 and entitled Phase Locked Oscillator for Storage Apparatus. It is recognized that the storage media in being moved relative to the recording and readback head can have variations in velocity. For instance with disc drive recording devices, the rotational speed of the disc can vary one or two percent, therefore an oscillator in the readback or recording circuit cannot be set at a constant frequency because these variations in speed of the recording media will change the actual frequency of the data thereby requiring that the clocking signal generator be maintained in synchronization with the relative velocity of the media. The above-mentioned patent describes one method of achieving this result by providing means for generating a reference signal representative of the angular velocity and phase of the storage means. A voltage control oscillator used for generating the clocking signal is regulated in response to this reference signal to correlate the frequency of the clocking signal with the velocity of the recording media relative to the read/write head.

Other attempts to reduce the time differential between the location of an address and the synchronization of the clocking signal have involved improvements in the phase lock oscillator circuit provided for generating the clocking signal. For instance, if the gain or bandwidth is increased, the clocking signal generator will lock onto the data both in frequency and phase at a faster rate. The lock-on time for the generator is an inverse function of the bandwidth of the clock recovery phase locked loop. However, attempts to increase the bandwidth makes the system more responsive to perturbation in the phase of the readback signal due to noise or pulse crowding and can cause unreliable clocking signals. Further attempts to improve such data readback systems have involved the use of dual mode phase locked oscillator systems such as that disclosed in U.S. Pat. No. 3,719,896 issued on Mar. 6, 1973, and entitled Phase Lock Oscillator With Phase Compensation Circuit for Use in Data Processing System. Such systems increase the bandwidth of the phase locked loop during the period of synchronization with the data signal and decrease the bandwidth during the normal data readback operation. Of course such systems are more complicated.

In each instance in prior recording and readback systems of the type previously discussed, there have been utilized separate phase locked circuits for the generation of a clocking signal during the writing of data and the generation of a clocking signal during the reading of data. Thus such readback clocking systems are subjected to typical servo system transient, lock-on time delays sometimes referred to as acquistion times in that the clocking signal generators must be synchronized with the data each time. Also such systems are complicated by the inclusion of these separate circuits. It is the purpose of the present invention to provide an improved data recording and readback system of the type heretofore discussed.

SUMMARY OF THE INVENTION

A data recording system in which data is recorded on and read back from a recording media and incorporating an improved phase locked oscillator for providing the clocking signal for the data both during data recording and readback. The phase locked oscillator normally is controlled by a reference voltage generated responsive to the velocity of the recording media. Switching means is provided for supplying the clocking signal to either the recording or readback circuitry. During data readback the phase lock osillator is already adjusted as to frequency and is momentarily stopped and then turned on in phase with the data being read.

DESCRIPTION OF THE INVENTION

Figure 1:
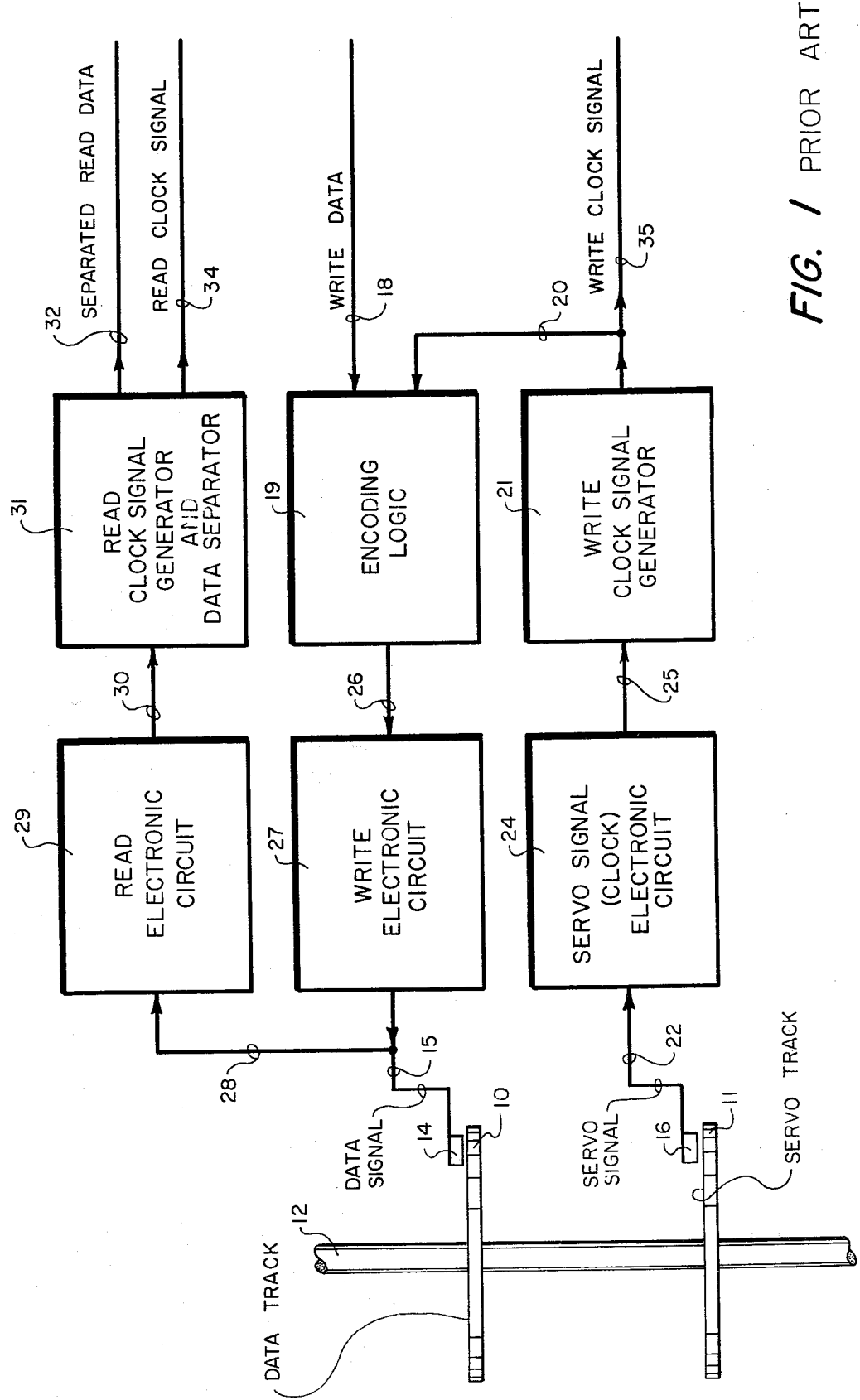
FIG. 1 is a block diagram of a typical prior art data recording system.

In FIG. 1 is shown a typical prior art data recording and readback system for use in computer systems. Shown schematically are two recording discs 10 and 11 mounted on a center spindle 12. The center spindle is driven in some suitable manner (not shown) so as to rotate the disc about the center axis. A read/write head 14 is utilized to record data on and read data from a magnetic film (not shown) fixed to the surface of the disc 10. Thus as relative motion between the head and the disc is effected by rotation of the disc and the spindle 12, data can be transmitted through the conductor 15 to and from the read/write head for data recording and readback.

For precise positioning of the read/write head there is utilized a servo signal detecting head 16 fixed to the same positioning mechanism (not shown) as the read/write head 14. Recorded on the disc 11 are servo tracks (not shown) which are detected by the servo head. Such prerecorded servo tracks have a predetermined constant frequency. However even though the invention is described with respect to a disc recording system which utilizes a prerecorded servo track and a dedicated servo head for position sensing, it should be remembered that the invention can be applied with equally beneficial results to such apparatus as other types of disc recording systems with other types of disc speed indicating sources or to other types of data recording systems such as tape transports.

For writing data onto the data disc 10 the data is received through the conductor 18 for encoding in the encoding logic circuit 19. Also transmitted to the encoding logic through the conductor 20 is a write clock signal generated by the write clock signal generator 21. In this embodiment the write clock signal is generated by detecting the servo track on the servo disc 11 by means of the servo head 16. This signal is transmitted through the conductor 22 to the servo signal electronics for detection and amplification of the signal. The clocking signal generated by the write clock signal generator 21 is adjusted in frequency responsive to any speed change in the servo disc 11 which naturally occurs also in the data disc 10. The signal is transmitted through the conductor 25 to the write clock signal generator for adjustment of the frequency of the basic write clock signal which subsequently is supplied to the encoding logic.

With the data properly encoded it is transmitted through the conductor 26 to the write electronics 27 and on through the conductor 15 to the data recording head 14 for recording on the data disc 10. Each of the signal processing circuits 19, 21, 24 and 27, utilized for writing data, are components used in present day data processing and recording systems.

For reading data from the data disc 10 the head 14 is positioned by sensing the proper clocking track on the disc 11 by use of the servo head 16. Thereafter the data is read through the record/readback head 14 and transmitted through the conductors 15 and 28 to the read electronic circuit 29. After amplification and processing, the signal is subsequently transmitted through the conductor 30 to the read clock generator and data separator 31 for generation of a clocking signal synchronized in phase and frequency with the frequency of the recorded data. This clocking signal is then used to separate the data from the clocking signal information, which data is subsequently transmitted through the conductor 32 for processing with a read clock signal being transmitted in parallel through the conductor 34. Such components are also well known and used in prior art data recording systems. For instances the Read Clock Signal Generator and Data Separator can be similar to that shown in U.S. Pat. No. 3,792,361 issued on Feb. 12, 1974 and entitled High Speed Data Separator. In addition a circuit similar to that of FIG. 1 is used in such prior art devices as that described in U.S. Pat. No. 3,208,057 issued on Sept. 21, 1965 and entitled Format Control for Disc Recording.

As indicated in the block diagram of FIG. 1 there is utilized a pair of phase locked loops, one being for providing the write clocking signal to write data on to the recording media, and the other being to generate a read clocking signal synchronized with the data being read both in frequency and phase. In the previous description the write clock signal generator 21 for supplying the write clock signal must be synchronized in frequency with the speed of the disc on which the recording is to take place. For instance, if the disc is being rotated at a speed slightly greater than the optimum predetermined speed, the frequency of the write clock must be increased very slightly so that the number of bits written on the track remains constant as the velocity varies. The signal utilized for synchronization of the disc rotating velocity and the write clock can be generated from the servo signal as shown in the drawing by detection of an index point on the disc or by detection of the passage of various points on the disc in any suitable manner which will provide a signal having a frequency responsive to the rotational speed of the disc.

The read clock generator 31 functions at a frequency responsive to the clocking frequency of the data being read. To adjust the frequency and phase relationship of the read clock relative to that of the data there is provided a preamble signal comprising a series of pulses at the beginning of each address on the media on which the data is recorded. This series of pulses provides a signal which is transmitted through the read circuitry to the read clock signal generator. Thereafter the frequency and phase of the read clocking signal generator is adjusted to match that of the data preamble signal.

However the read clocking signal generator in prior devices is provided no reference signal to which it can be synchronized other than the preamble signal detected immediately before the data is to be read. Thus there exists a servo system transient time delay during which the read clock is adjusted in frequency and phase to match that of the data being detected. It should be note also that in prior devices during the read operation the write clock is not utilized, and during the write operation, the read clock is not utilized. During such time of inactivity the read clock has been maintained operational at a basic frequency having no direct relationship with the actual velocity of the media, or in some systems is actually stopped, while the write clock has remained at a frequency proportional to disc rotational velocity.

Figure 3:
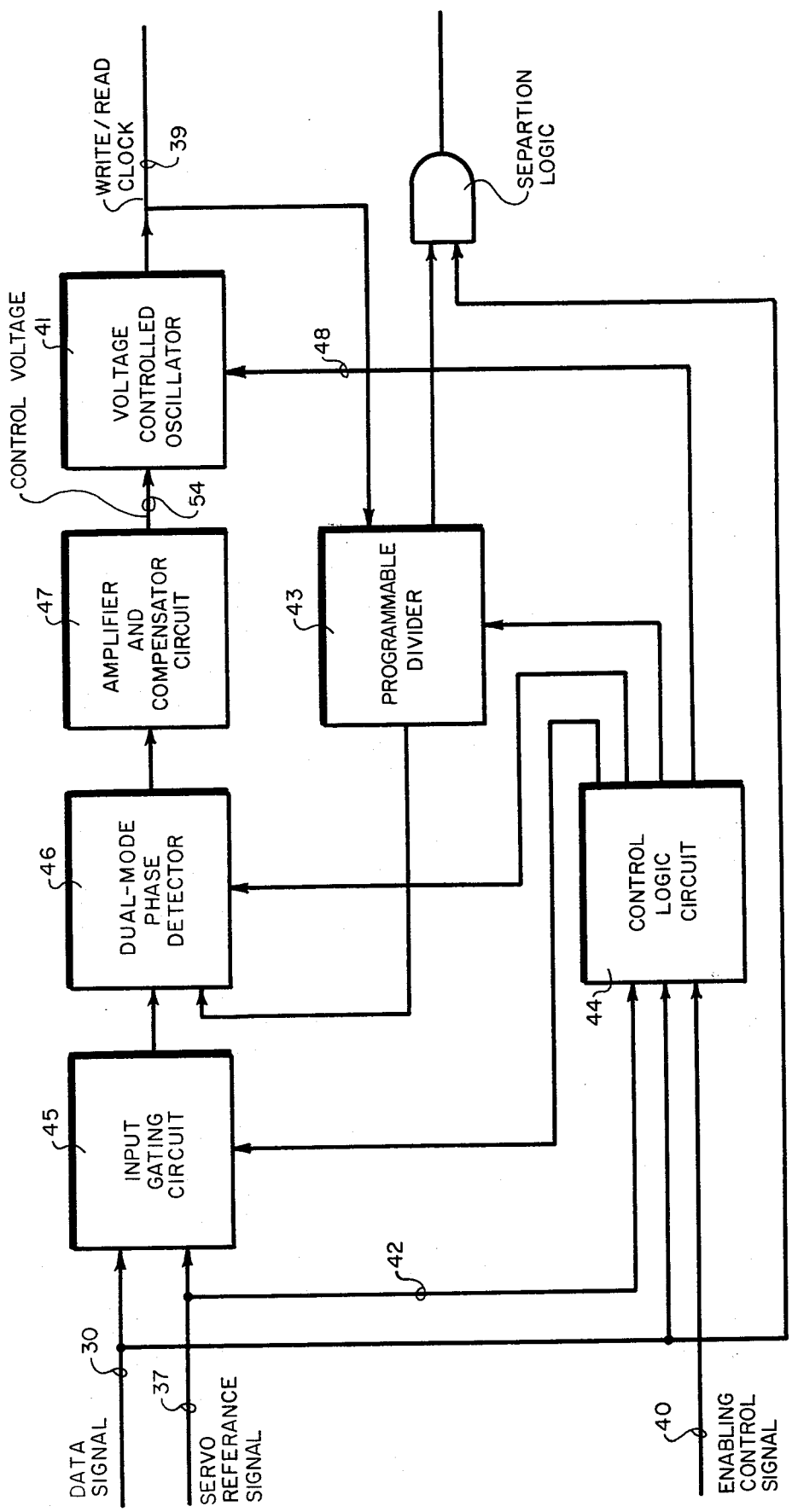
FIG. 3 is a block diagram of the phase locked loop of FIG. 2.

In accordance with the present invention, the data recording system just described is improved by the utilization of only one clocking signal generator with such signal generator being maintained in synchronism with the recording media by use of a reference signal generated responsive to the velocity of the media. Thus for reading or writing data on to the record media the clocking signal generator always remains adjusted to the correct frequency by use of the appropriate reference signal. When it is desired to read data from the record media, the clocking signal generator, being already adjusted to the correct frequency through its control voltage or signal 54 shown in FIG. 3, is momentarily stopped and restarted in synchronism with the data being read so as to synchronize the phase relationship of the clocking signal and that of the data for correct reading of the recorded data.

Figure 2:
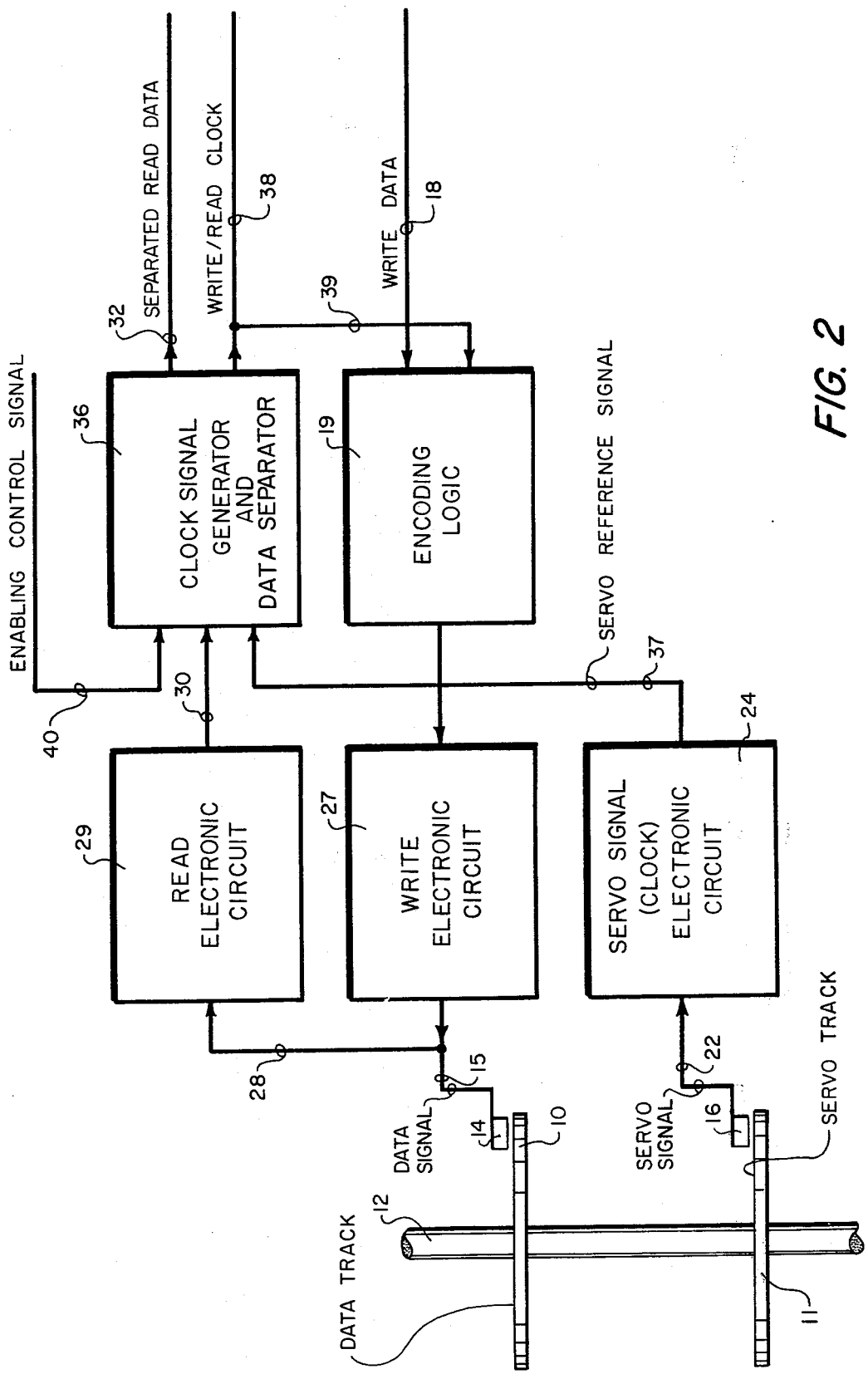
FIG. 2 is a block diagram of one embodiment of the present invention.

Thus as shown in FIG. 2 the read/write system utilizes a similar data disc 10, servo disc 11, encoding logic 19, servo signal electronic circuit 24, write electronic circuit 27 and read electronic circuit 29. The difference from the circuit of FIG. 1 involves the use of only one clock signal generator 36 to provide the clocking signal for both reading and writing the data on the data disc 10. For synchronization of the frequency of the clocking signal generator the servo signal electronic circuit 24 supplies a reference signal through the conductor 37, such reference signal being generated responsive to the servo track signal in the same manner as described with respect to FIG. 1. The clocking signal generator supplies a write clock signal through the conductors 38 and 39 to the encoding logic 19 for timing the writing of data received through the conductor 18.

To generate a read clocking signal there is supplied through the read electronic circuit 29 and the conductor 30 the data being read which allows synchronization of the clocking signal therewith.

The function of the clock signal generator 36 is to always generate a clocking signal which is synchronous with the velocity of the media, i.e., the rotational speed of the data disc in the subject embodiment, by responding to the reference signal generated by the servo electronics. Thus the clock signal generator at all times is set to generate an output signal having a frequency referenced to the velocity of the media. Therefore if write data is received through the conductor 18 this write data is recorded responsive to the signal of the clocking signal generator and therefore in synchronism with the velocity of the media.

During the reading of data from the data disc 10 the incoming signal from the read electronic circuit 29 is transmitted through the conductor 30 to the clock signal generator which is stopped momentarily and thereafter restarted upon the receipt of a timing pulse from the preamble of the data to be read, thereby assuring that the clocking pulses generated are in synchronism with the data being read. While the clocking signal phase is corrected in this manner the frequency need not be corrected since the clock signal generator has been corrected continuously in response to the servo signal indicating the velocity of the recording media. Thus there is need to readjust the frequency of the clocking signal only as required by any interim changes in velocity of the media. It can be assumed that in the few nanoseconds that the clock signal generator is stopped for restarting in synchronism with the incoming data signal, the velocity of the media remains substantially unchanged because of the extreme short duration in time lapsed In FIG. 3 is shown the clocking signal generator which receives the servo reference signal through the conductor 37, the data signal through the conductor 30 and an enabling control signal through the conductor 40. As stated before the purpose of this generator is to generate a clocking signal suitable for separating the data and clocking signals as the data is read for providing the write clocking signal and for processing the data subsequently. This generator also acts responsive to the servo reference signal to vary the output signal frequency as the speed of the recording media varies to generate a clocking signal suitable both for the recording of data and the processing of the data read from the media. The generator also functions in a manner to enable the stopping and instantaneous starting so that the frequency signal can be brought into phase with the data signal during the reading process.

The circuit of FIG. 3 utilizes a voltage controlled oscillator 41 to generate a clocking signal. At all times other than while reading data a servo reference signal received through the conductor 37 is transmitted through the conductor 42 to the control logic circuit 44. The control logic circuit serves to switch the various input signals to enable the clock generator to function during data record, data readback and inactive time periods. Thus during periods of inactivity or writing, i.e. when not reading data, the servo reference signal is supplied through the input gating circuit 45, the dual mode phase detector 46 (operating in non-harmonic mode) and the amplifier and compensator 47 to the voltage control oscillator to set it at a frequency responsive to the velocity of the recording media during these phases of operation of the data recording system. Thus for data recording there is supplied through the conductor 39 a clocking signal governing that function of the system. The control logic regulates the programmable divider 43 to divide the frequency of the signal supplied to the phase detector 45. If the signal being used to synchronize the frequency of the system is the servo signal or the data, different divisions must be made to correlate those signals with that of the clocking signal.

During the data readback operation of the circuit, the dual mode phase detector operates in a harmonic mode. For a complete understanding of the operation of the dual mode phase detector reference can be made to U.S. application Ser. No. 647,594 entitled Two-Mode Harmonic and Non-Harmonic Phase Detector, filed on Jan. 8, 1976, and assigned to the Sperry Rand Corporation. Thus the voltage controlled oscillator is controlled responsive to the servo reference signal indicating the velocity of the recording medium. Of course the voltage controlled oscillator is always maintained at the desired frequency responsive to the velocity of the media and need only be adjusted for any slight phase or frequency change necessary which occurs when the voltage controlled oscillator is shut off momentarily by receipt of a gate signal through the conductor 48. This gate signal results from an enabling control signal which is generated indicating that data should be read. When the enabling signal is received by the control logic it sets the dual mode phase detector in the harmonic mode and momentarily shuts off the voltage control oscillator. Thereafter the oscillator is started in correct phase relationship with data received.

Figure 4:
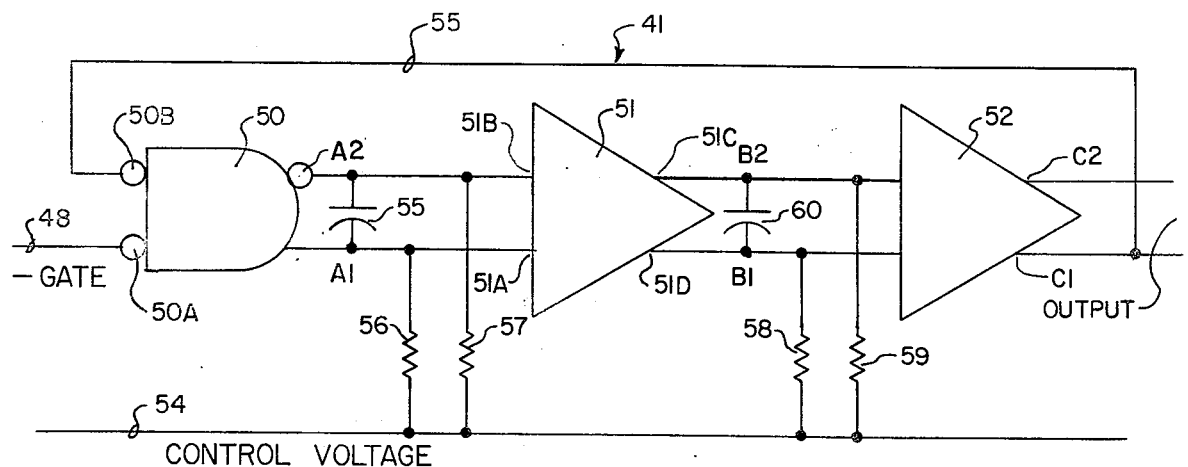
FIG. 4 is a circuited diagram of the voltage controlled oscillator of FIG. 3.
Figure 5:
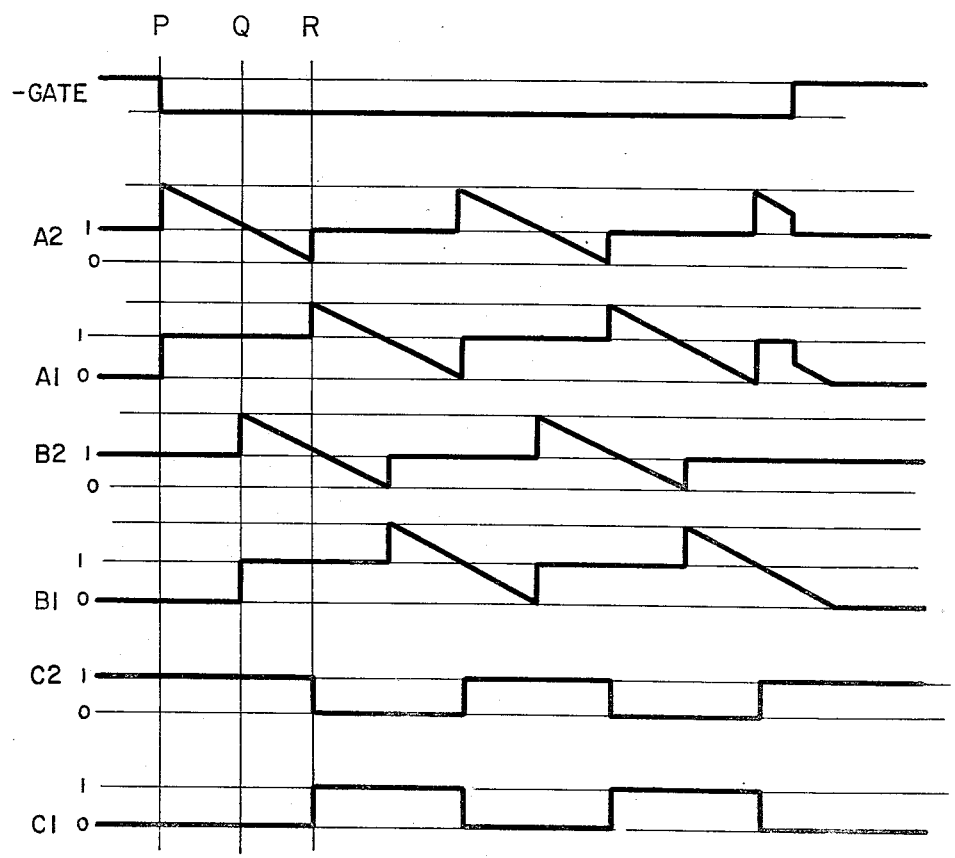
FIG. 5 shows various wave forms for the oscillator of FIG. 4.

The voltage controlled oscillator is illustrated in FIG. 4 with the waveforms therefor shown in FIG. 5. Generally, this oscillator includes emitter coupled logic and comprise an AND gate 50 having the output signal fed to a pair of voltage comparators or line receivers 51 and 52. The overall requirement of the voltage controlled oscillator 41 is to generate a clocking signal, but also to function in a manner to allow immediate stopping for restart in phase with a control signal. Generally speaking this oscillator works by generating a triangular voltage waveform across capacitors for detecting the zero crossings thereof by use of the differential amplifiers. Thus each of the differential amplifier circuits provides a 90° phase shift such that the inversion of the feedback signal provides the remaining 180° phase shift.

The control voltage is supplied through the conductor 54 from the amplifier 47. The gates 51 and 52 can be of the type made by Motorola, Identification number MC 10116. The AND gate 50 can be of the type made by Motorola, Identification number MC 10102. The outputs of the gates 51 and 52 are open-emitter, emitter followers such that the positive going transient signal of one emitter tends to turn off the other emitter by way of the capacitors 55 or 60 and allows the capacitors connected thereto to ramp down via the current supplied through the appropriate magnitude of resistance responsive to the level of the control voltage on the conductor 54.

The AND gate 50 directly "ands" the feedback signal with the gate signal received from the control logic 44 through the conductor 48. When the oscillator is disabled by receipt of a low signal at the terminal 50A, the final conditions remain exactly the same as those at the beginning of a cycle. Thus the oscillator can be restarted with no delay time.

To explain the operation of the oscillator the gate signal is maintained low for the generation of an output clocking signal. The oscillator feedback signal is received through the conductor 55 to the other terminal 50B of the AND gate 50. With both outputs being low the output at the terminal $A_1$ will be high and the output at the terminal $A_2$ can be low. Thus as shown in the waveforms of FIG. 5, when the gating signal goes low as occurs at point P the terminal $A_1$ rises to logic 1 and $A_2$ rises by a voltage amount equal to the difference between logic 0 and logic 1 because the voltage across the capacitor 55 cannot change instantaneously and thereafter will drop because of current flow through the resistor 57.

At the time Q when voltage at terminal $A_2$ equals that of $A_1$, $B_1$ terminal goes to logic 1 and $B_2$ rises by an amount between logic 0 and logic 1. The line receiver 51 functions essentially as a voltage comparator. For instance if the voltage at terminal 51A is more positive than the voltage at terminal 51B, the terminal 51D will be high and the terminal 51C may go low. Conversely if the voltage at terminal 51B is more positive than that at terminal 51A, the output terminal 51D may go low while the terminal 51C must be high. However because of the open emitter and interemitter capacitor, only the high levels are immediately transmitted through the outputs of the devices.

Based on the foregoing, at point Q when the voltage at $A_2$ equals that of $A_1$, terminal $B_1$ will go to logic 1 and $B_2$ will rise by a predetermined voltage and start to fall as shown at that point in the waveform for $B_2$. In the meantime terminal $A_2$ continues to fall until it reaches a 0 level, at which time $B_2$ will have swung past the voltage level of $B_1$, thereby causing the terminal $C_1$ and $C_2$ to reverse logical polarities. The feedback signal now conducted through the conductor 55 causes terminal $A_2$ to rise to logic 1 and $A_1$ to be boosted by a voltage V in the manner that terminal $A_2$ was raised one-half cycle earlier.

The oscillator thus continues to function as described until the negative gate returns to an inactive state. Thereafter within three-fourths of a cycle the capacitors will have charged to their steady state value and the oscillator is ready to be started in phase again. Thus it can be seen that the oscillator provides an output signal whose frequency is dependent upon the level of the control voltage on the conductor 54 which regulates the voltages across the resistors 56, 57, 58 and 59.

Based on the foregoing description, the circuit of FIG. 2 functions to supply a clocking signal $C_1$ and $C_2$ from the generator 36 for both reading and writing of data. The same clock is utilized and is maintained in synchronism with the velocity of the recording media by means of the servo reference signal indicating that velocity. When it is desired to read data the oscillator is already set at the correct frequency since it is maintained correct by constant reference to the media velocity and need only be shut off by receipt of a gating signal and thereafter be turned back on to be in proper phase relationship with the data signal. When the oscillator is reenergized, the frequency of the clocking signal is the same as before stopping since the level of the control voltage on line 54 remains constant during the stopping period. Thus only one oscillator need be used for both reading and writing of data which oscillator can be phased with incoming data substantially instantaneously for effective separation of the data from the clocking signal and the processing of the data.

The invention claimed:

1. A system for reading data from a recording media, comprising in combination:

data readback means for reading data from the recording media;

clocking signal generating means for generating a clocking signal for data read from the recording media, said clocking signal having a frequency responsive to an input signal supplied to the generating means;

means to regulate the input signal responsive to the frequency of the data recorded on the recording media;

means to momentarily stop the clocking signal generating means when said data readback means is energized to read data from the media and when data is detected from the media by the readback means; and means to start the clocking signal generating means with the phase of the clocking signal corresponding to the phase of the data signal whereby the clocking signal will be set at a frequency corresponding to that of the data signal with the setting of the input signal as previously determined.

2. A system for reading data from and recording data on a recording media, said recording media being capable of generating a media signal responsive to the velocity of the recording media;

data recording means to write data on the recording media;

data readback means to read data from the recording media;

a clocking signal generator for generating a clocking signal for the data having a frequency responsive to an input signal;

means to adjust said input signal responsive to changes in velocity in the recording media, thereby to maintain the clocking signal frequency at a level responsive to the velocity of the media;

means to supply the clocking signal to the data recording means while writing data on the recording media;

means to stop the clocking signal generator when the data readback means is energized to detect data from the recording media; and means to start said clocking signal generator when said readback means detects data from the recording media, said starting being accomplished at a time responsive to the data thereby to correlate the phase of the clocking signal with the data.

* * * * *